United States Patent [19]

Yamada et al.

[11] Patent Number: 5,169,610
[45] Date of Patent: Dec. 8, 1992

[54] METHOD FOR THE PURIFICATION OF RARE EARTH OXYSULFIDE

[75] Inventors: Kasuhiro Yamada, Kanagawa; Norifumi Yoshida, Fukui, both of Japan

[73] Assignee: Shin-Etsu Chemical Ltd., Tokyo, Japan

[21] Appl. No.: 772,665

[22] Filed: Oct. 7, 1991

[30] Foreign Application Priority Data

Oct. 8, 1990 [JP] Japan ................................ 2-270292

[51] Int. Cl.$^5$ ............................................. C01F 17/00
[52] U.S. Cl. .............................. 423/21.1; 423/243.02; 423/511; 423/576.2; 423/210
[58] Field of Search ............ 423/21.1, 210, 242, 423/244, 571, 512 R, 528, 573.1, 576.2; 55/73; 252/301.45

[56] References Cited

U.S. PATENT DOCUMENTS 3,850,837 11/1974 Nath ............................ 252/301.45

FOREIGN PATENT DOCUMENTS 59-164631 9/1984 Japan .
2-212586 10/1990 Japan .

OTHER PUBLICATIONS

Chemical Absracts, 249290r, 1980 Leskela, Markku et al.

Primary Examiner—Theodore Morris
Assistant Examiner—Edward Squillante

[57] ABSTRACT

An efficient method is proposed for decolorizing a rare earth oxysulfide, which is usually slightly colored in grey as prepared by the sulfiding reaction of a rare earth oxide with hydrogen sulfide, by removing sulfur impurity. The method comprises two steps of heat treatmentof which the first step is conducted in air at 450° to 550° C. for 2 to 5 hours and the second step is conducted in an inert gas, e.g., argon, at 800° to 950° C. for 2 to 5 hours.

3 Claims, 1 Drawing Sheet

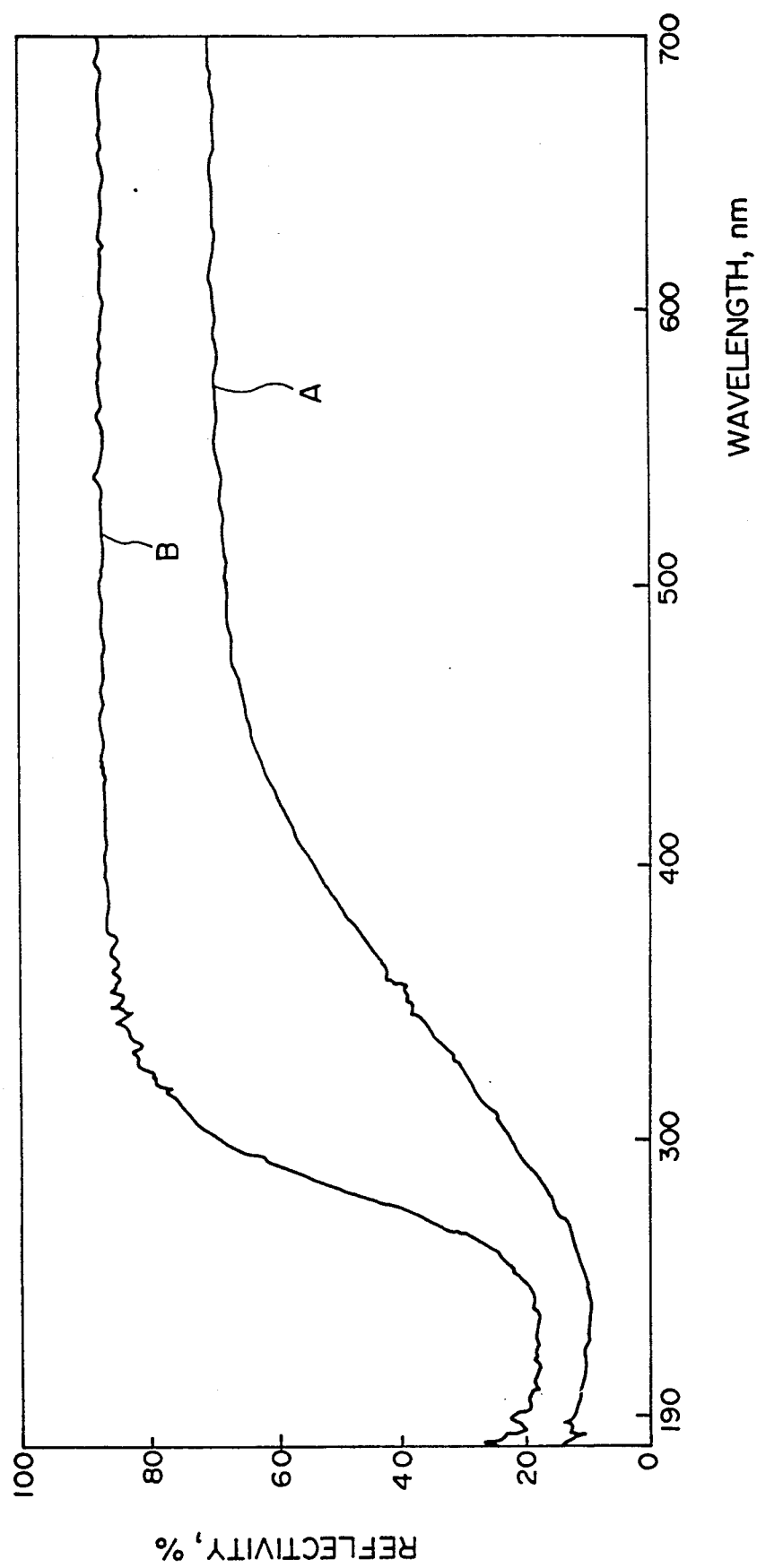
FIGURE

METHOD FOR THE PURIFICATION OF RARE EARTH OXYSULFIDE

BACKGROUND OF THE INVENTION

The present invention relates to a method for the purification of a rare earth oxysulfide. More particularly, the invention relates to a method for the purification of a rare earth oxysulfide by removing sulfur contained therein so as to give a rare earth oxysulfide product having greatly increased whiteness to be suitable, for example, as a material of the scintillators for X-ray CT.

Rare earth oxysulfides used as a material of X-ray CT scintillators are usually prepared by the reaction of hydrogen sulfide with a rare earth oxide at a high temperature. A problem in the rare earth oxysulfide as produced by this reaction is that the oxysulfide thus produced is slightly colored in grey, presumably, due to the content of sulfur therein in an amount of 1% by weight or even larger. Such a colored rare earth oxysulfide is undesirable as a material of scintillators in respect of the decrease in the light transmissivity. Accordingly, it is eagerly desired to develop a method for obtaining a pure white product of a rare earth oxysulfide by removing the sulfur impurity but none of the prior art methods can provide a complete solution of the problem.

SUMMARY OF THE INVENTION

The present invention accordingly has an object to provide a novel and efficient method for removing the impurity of sulfur from a rare earth oxysulfide slightly colored in grey so as to give a rare earth oxysulfide product of greatly enhanced whiteness.

Thus, the method of the present invention for removing the impurity of sulfur from a rare earth oxysulfide comprises the successive steps of:

(a) heating the rare earth oxysulfide containing sulfur in an oxidizing atmosphere containing oxygen at a temperature in the range from 450° to 550° C. for a length of time in the range from 2 to 5 hours; and (b) heating the rare earth oxysulfide after the step (a) in an inert gas selected from the group consisting of rare gases, e.g., argon and helium, and nitrogen at a temperature in the range from 800 to 950° C. for a length of time in the range from 2 to 5 hours.

BRIEF DESCRIPTION OF THE DRAWING

The FIGURE shows spectra of light reflection of gadolinium oxysulfide samples before and after the purification treatments in Example 1 according to the inventive method by the curves A and B, respectively.

DETAILED DESCRIPTION OF THE PREFERRED EMBODIMENTS

As is described above, the scope of the inventive method consists in the two-step heat treatment of the starting rare earth oxysulfide, of which the heat treatment of each step is performed in a different atmosphere under different heating conditions from the other. The method of the present invention is applicable to any rare earth oxysulfides regardless of the preparation method but is typically effective for the rare earth oxysulfide products prepared by the sulfiding reaction of the corresponding rare earth oxide with hydrogen sulfide. The sulfiding reaction of a rare earth oxide with hydrogen sulfide is carried out by heating the rare earth oxide in a fused quartz glass vessel at a temperature of 600° to 700° C. under a stream of hydrogen sulfide gas. The thus obtained rare earth oxysulfide is usually colored in a slightly greyish color, presumably, due to the impurity of sulfur while such a slightly greyish rare earth oxysulfide can be remarkably whitened according to the two-step heat treatment of the inventive method.

The heat treatment in the first step is performed in an oxidizing gaseous atmosphere containing oxygen. Most conveniently, the oxidizing gas can be air but it is optional to use a gaseous mixture of oxygen and other inert gases. The content of oxygen in such a gaseous mixture should be at least 20% by volume. Pure oxygen is of course suitable. The temperature of this first-step heat treatment is in the range from 450° to 550° C. and the length of time for the heat treatment is in the range from 2 to 5 hours. When the temperature of the heat treatment is too low or the treatment time is too short, the desired effect of decolorization cannot be fully exhibited as a matter of course while increase of the temperature or the treatment time to exceed the above mentioned upper limits would have no additional advantageous effect.

The second-step heat treatment of the rare earth oxysulfide to follow the above described first-step heat treatment is performed in an atmosphere of a gas selected from the group consisting of rare gases, e.g., argon, helium and neon, nitrogen and hydrogen. The heat treatment is conducted at a temperature in the range from 800° to 950° C. for a length of time in the range from 2 to 5 hours. When the temperature of the heat treatment is too low or the treatment time is too short in this second-step treatment, the desired effect of decolorization cannot be fully exhibited as a matter of course while increase of the temperature or the treatment time to exceed the above mentioned upper limits would have no additional advantageous effect.

The method of the present invention is applicable to the oxysulfide of any rare earth element including yttrium and the elements having an atomic number of 57 through 71 or, in particular, to the white-colored rare earth oxysulfides. It will be recognized, of course, that a mixture of two kinds or more of different rare earth oxysulfides can be treated by the inventive method.

In the following, the method of the present invention is described in more detail by way of examples which, however, should not be construed to limit the scope of the invention in any way.

EXAMPLE 1.

Gadolinium oxide in an amount of 5 g was taken in a boat of fused quartz glass which was placed in a fused quartz glass tube of a tubular furnace. The tube was flushed with argon by passing argon gas for 3 hours. The temperature of the tube was increased up to 650° C. while argon gas was passed therethrough at a rate of 0.2 liter/minute. While keeping this temperature, thereafter, hydrogen sulfide gas was passed through the tube for 8 hours at a rate of 0.2 liter/minute to effect the sulfiding reaction of the gadolinium oxide followed by cooling to room temperature with the flow of argon gas interrupted.

The thus obtained powdery product, which could be identified as gadolinium oxysulfide from the results of the X-ray diffractometry and elementary analysis, was slightly greyish in color and the spectrum of light reflection thereof was as shown by the curve A in the figure of the accompanying drawing. The reflectivity was generally low throughout the visible region and a particularly remarkable decrease was found in the reflectivity when the wavelength was decreased from 460 nm to 330 nm.

The gadolinium oxysulfide powder on the boat was again put into the reactor tube of the furnace. The temperature of the tube was increased up to and kept at 500° C. for 2 hours followed by cooling to room temperature while air was passed through the tube at a rate of 0.2 liter/minute. Thereafter, the flow of air was switched to a flow of argon gas at the same flow rate and the temperature was increased up to and kept at 850° C. for 3 hours followed by cooling to room temperature. A deposit was found on the wall of the reactor tube and analyzed by the EPMA method to be identified as sulfur. The content of remaining sulfur in the thus treated gadolinium oxysulfide was 0.1% by weight or smaller.

The thus obtained powder of gadolinium oxysulfide was pure white in color and the spectrum of light reflection thereof was as shown by the curve B in the figure of the accompanying drawing. As is clear from this spectrum, the reflectivity was generally increased throughout the visible region as compared with the spectrum of the untreated gadolinium oxysulfide shown by the curve A. The increase in the reflectivity was particularly remarkable in the wavelength range of 330 to 460 nm.

EXAMPLE 2.

Yttrium oxysulfide, as identified by the X-ray diffractometry and elementary analysis, was prepared from yttrium oxide in substantially the same manner as in the preparation of the gadolinium oxysulfide in Example 1.

The thus obtained powder of yttrium oxysulfide was slightly colored in grey.

The yttrium oxysulfide powder in the boat was put into the reactor tube of the furnace. The temperature of the tube was increased up to and kept at 500° C. for 2 hours followed by cooling to room temperature while air was passed through the tube at a rate of 0.2 liter/minute. Thereafter, the flow of air was switched to a flow of argon gas at the same flow rate and the temperature was icreased up to and kept at 850° C. for 3 hours followed by cooling to room temperature. The thus obtained yttrium oxysulfide powder was pure white in color. A deposit was found on the wall of the reactor tube and analyzed by the EPMA method to be identified as sulfur.

What is claimed is:

1. A method for removing the impurity of sulfur from a rare earth oxysulfide which comprises the steps of:
(a) heating the rare earth oxysulfide containing sulfur in an atmosphere of an oxidizing gas containing at least 20% by volume of oxygen at a temperature in the range from 450° to 550° C.; and
(b) heating the rare earth oxysulfide after step (a) in an atmosphere consisting essentially of argon argon at a temperature in the range from 800° to 950° C.

2. The method for removing the impurity of sulfur from a rare earth oxysulfide as claimed in claim 1 in which the length of time for heating in step (a) is in the range from 2 to 5 hours.

3. The method for removing the impurity of sulfur from a rare earth oxysulfide as claimed in claim 1 in which the length of time for heating in step (b) is in the range from 2 to 5 hours.

* * * * *

UNITED STATES PATENT AND TRADEMARK OFFICE
CERTIFICATE OF CORRECTION

PATENT NO. : 5,169,610

DATED : December 8, 1992

INVENTOR(S) : KAZUHIRO YAMADA and NORIFUMI YOSHIDA

It is certified that error appears in the above-identified patent and that said Letters Patent is hereby corrected as shown below:

On title page, item [75], delete "Kasuhiro" and insert —Kazuhiro—.

Column 4, line 24, delete "argo" (second occurrence).

Signed and Sealed this

Twenty-sixth Day of October, 1993

Attest:

BRUCE LEHMAN

Attesting Officer        Commissioner of Patents and Trademarks